(No Model.)
T. N. CLARK.
FOUNTAIN SPITTOON.
No. 604,692. Patented May 24, 1898.
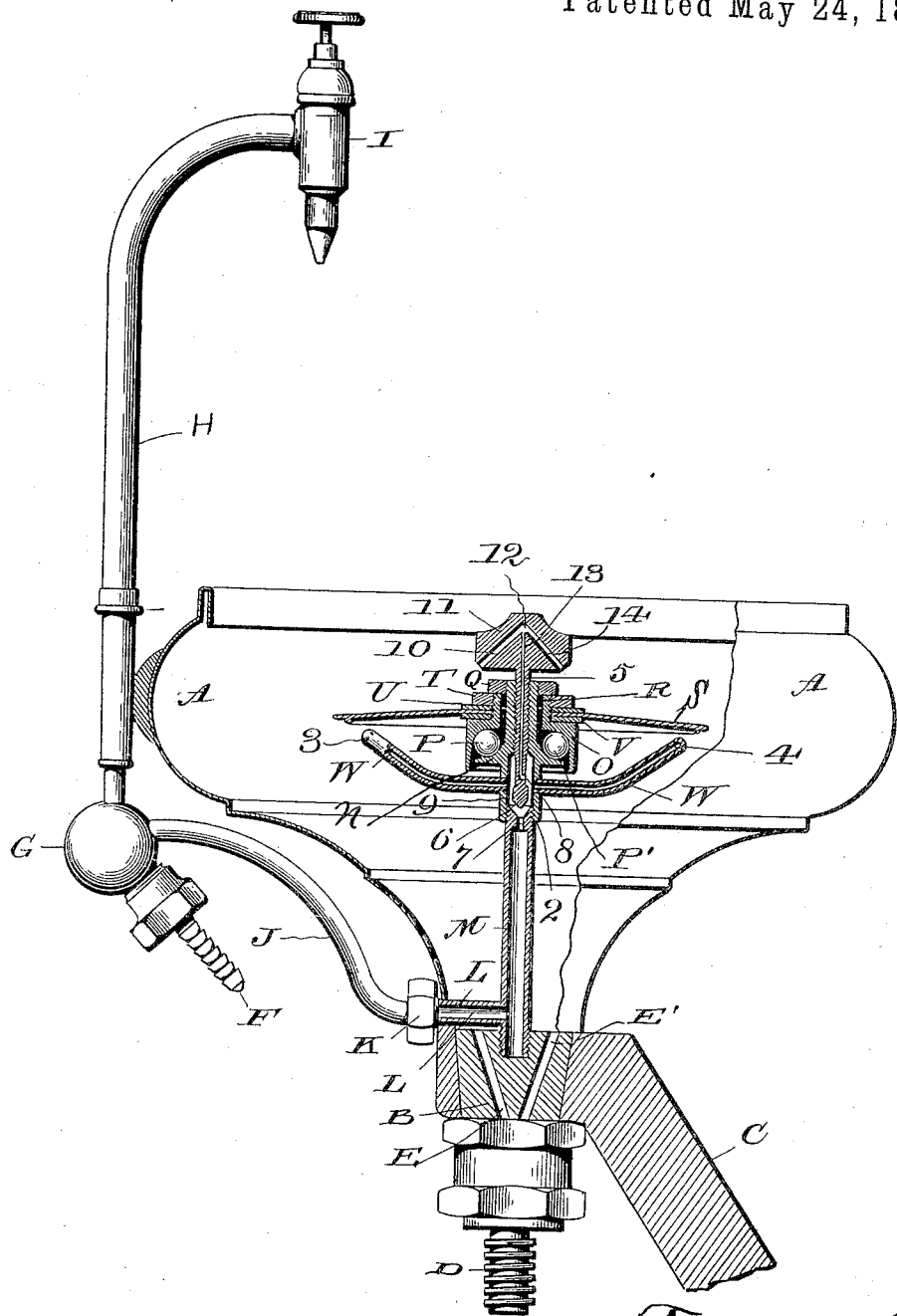
Witnesses
L. C. Hills.
A. L. Hough.
Theodore N. Clark
Inventor
By his Attorney Franklin N. Hough

UNITED STATES PATENT OFFICE.

THEODORE NELSON CLARK, OF TORONTO, CANADA.

FOUNTAIN-SPITTOON.

SPECIFICATION forming part of Letters Patent No. 604,692, dated May 24, 1898.

Application filed December 23, 1897. Serial No. 663,255. (No model.)

*To all whom it may concern:*

Be it known that I, THEODORE NELSON CLARK, a citizen of the United States, residing at Toronto, in the county of York and Dominion of Canada, have invented certain new and useful Improvements in Fountain-Spittoons; and I do declare the following to be a full, clear, and exact description of the invention, such as will enable others skilled in the art to which it appertains to make and use the same, reference being had to the accompanying drawing, and to the letters and figures of reference marked thereon, which forms a part of this specification.

My invention relates to an improved means of cleansing a spittoon-bowl; and it consists, substantially, first, of a revolving disk within a bowl; second, a means of spraying water above and below said disk and causing said disk to revolve, thereby distributing the water over the inside surface of the bowl; third, a channeled valve-stem and head-piece as a means of delivering water above and over the disk and to regulate the speed of said disk; fourth, one or more ejectors as a means of delivering a stream of water tangent to the disk, and, fifth, a ball-bearing journal with male and female cones, the female cone protecting the journal from contact with the water, thereby insuring durability and easy and noiseless running. I attain these objects by the mechanism shown in the accompanying drawing, in which—

A is a spittoon-bowl (shown in partial cross-section) attached through the medium of a tapering ground joint B to the standard C. The waste water from the spittoon is discharged through a series of openings at the bottom of the bowl A. In the drawing, E and E' represent two of these discharge-holes. These series of holes discharge into the trunk-outlet at D.

F is a water-inlet with means for attaching to it a flexible supply-pipe.

G is a fitting allowing the connection of two branch pipes H and I. H is a supply-pipe for an auxiliary water-tap I.

J is a water-supply pipe for the apparatus inside the bowl A.

K is a union-joint for connecting the pipe J to the pipe L. The pipe L connects with and supplies the upright pipe M. The pipe M is securely fastened at its lower end to the tapering joint B. At the upper end of pipe M is fastened the axle N at the point 2. The axle N is essentially a male cone, forming part of the ball-bearing hub, of which O is the female cone, and P and P' are the balls. The sides of the cone O, I extend downward to overlap the cone N, which prevents the water when splashed in a downward direction from entering the journal. Q is a thumb-nut for adjusting the ball-bearing journal, and R is a collar attached to the axle or cone N to prevent side play or tilting of the hub or cone O.

Attached to the hub or cone O is a disk S, of glass or other material, preferably of glass. The washers U and V are placed each side of the disk S to prevent said disk from breaking when bound to the hub O by the nut T. Attached to the hub or cone N are one or more radial hollow arms with their extreme outer ends closed. In the drawing two radial arms are shown, W and W'. On one side of the arm W', at or near its outer end, is a small hole 4. On the arm W is a similar hole, but on the opposite side of the arm. The valve-stem 5 is channeled, with the lower end of the channel 13 opening at 8 into the chamber 9, the upper end of said channel 13 opening into the point at 12. The valve 6 and the valve-seat 7 are a means of regulating the supply of water to the parts above said valve. At the upper end of the valve-stem 5 is head-piece 11, which also serves as a thumb-nut with which to actuate the valves. The head-piece 11 is drilled with a series of oblique holes 10 and 14, meeting at a common center 12.

The operation of my fountain-spittoon is as follows: A supply of water under pressure is delivered at F, passes into the pipe M, and up to the valve-seat 7. When it is desired to start the fountain, the valve 6 is opened by turning the head-piece 11, which allows the water to pass up into the chamber 9, where it divides, part passing through the opening 8, into the channel 13, up into the common meeting-point 12 of the oblique holes 10 and 14 in the head-piece 11, thence dividing itself among said holes 10 and 14, and delivers itself downward upon the disk S. The second division of the water in the chamber 9 passes into the radial arms W and W' and out at the holes 3 and 4, ejecting itself obliquely against the disk S, causing said disk to revolve. The disk S revolving at a certain speed throws the water delivered to it by the arms W and W' and the head-piece 11 against the inner surface of the spittoon-bowl A, thereby cleansing said bowl, the waste passing out at the holes E and E' into the opening at D.

I am aware that prior to my invention fountain-spittoons have been made with a revolving inner part. Therefore I do not claim such an invention, broadly.

Having thus described my invention, what I claim to be new, and desire to secure by Letters Patent, is—

1. In a spittoon, the combination with the body portion and supply-pipe, of the valve-chamber secured to the upper end of said supply-pipe, radial arms extending therefrom, which arms are apertured near their ends, the valve mounted in said chamber, the threaded stem to said valve, the adjusting head-piece to the stem, of the disk mounted above the said chamber, and the ball-bearings, arranged as set forth.

2. In a spittoon, the standard, the body portion mounted thereon, the supply-pipe mounted in said standard, the valve-chamber communicating with said pipe, the exit-ducts leading from the chamber through the standard, radial arms W, the rotary disk mounted above the said valve-chamber, and provided with ball-bearings, the valve and stem mounted centrally in said valve-chamber, and means for regulating the said valve, as shown and described.

3. In a spittoon, the combination with the supply-pipe, the valve-chamber, the radially-arranged pipes leading from said chamber, the rotary disk mounted above the said valve-chamber and having ball-bearing connection therewith, the valve-stem mounted in said chamber, and provided with a duct in said stem opening into the said chamber, the adjusting part of the valve-stem and radial ducts opening downward at the outer end of the adjusting part of the valve-stem, which ducts communicate with the duct in the stem of the valve, as shown and described.

In testimony whereof I affix my signature in presence of two witnesses.

THEODORE NELSON CLARK.

Witnesses:
SYDNEY A. C. GREENE,
JENNIE LAWSON.